Aug. 11, 1959     R. M. CAMPBELL     2,898,772
VARIABLE SPEED CONE PULLEY DRIVE
Filed June 18, 1957
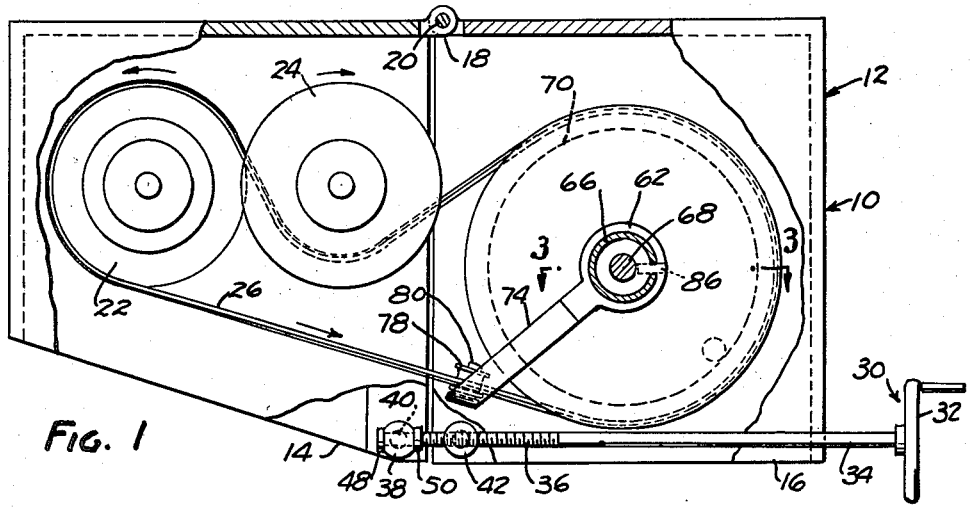
FIG. 1
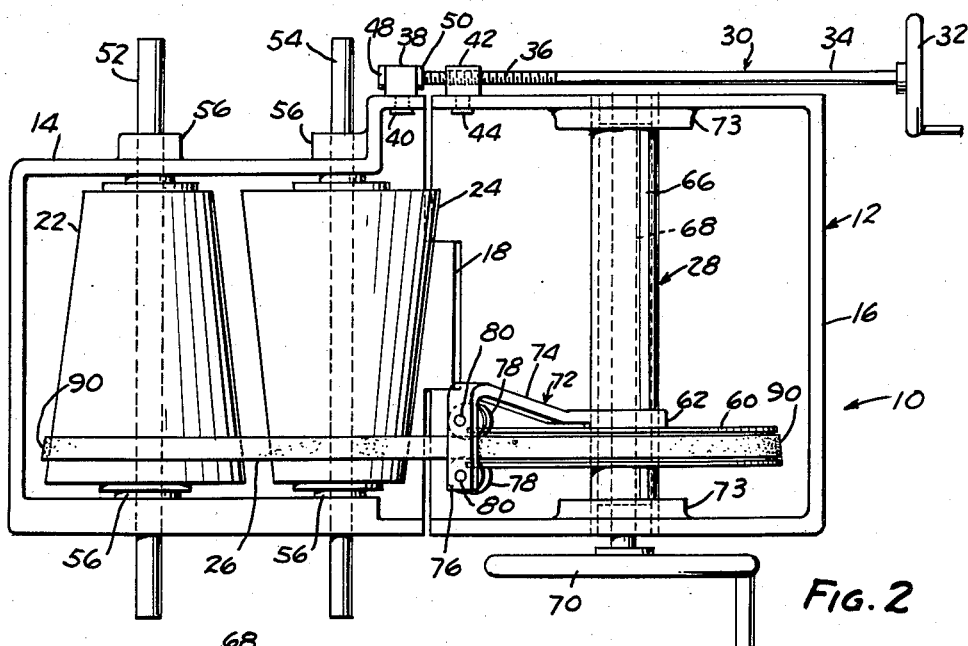
FIG. 2
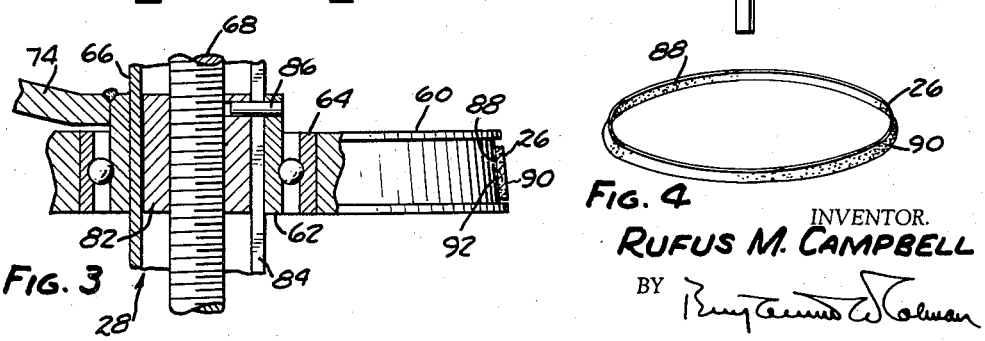
FIG. 3
FIG. 4
INVENTOR.
RUFUS M. CAMPBELL
BY
ATTORNEY.

United States Patent Office 2,898,772
Patented Aug. 11, 1959

2,898,772
VARIABLE SPEED CONE PULLEY DRIVE
Rufus M. Campbell, Drayton Plains, Mich.
Application June 18, 1957, Serial No. 666,285
4 Claims. (Cl. 74—217)

This invention relates to a variable speed cone pulley drive and more particularly to cone pulleys arranged in reverse fashion with respect to each other, their axes being parallel, and driven by a belt designed to make full contact across the side walls of the belt, the belt being shiftable across the faces of the pulleys to vary the output speed of the drive.

The invention involves a pair of cone pulleys mounted in a housing and driven by a belt having a shape such that it will make full contact on both side walls of the belt as it drives the pulleys, thus reducing the slip between belt and cone pulleys to which such constructions have heretofore been subject. Unless the configuration or pitch of the cone pulleys is designed into the belt, it has been found that the contact lines or surfaces of the belt with the pulleys results in excessive slip, rapid destruction of the belt, inefficient power transmission, uncontrolled variation in output speed, and other undesirable effects.

Upon analysis of these difficulties, it was found that by designing the belt with the same pitch across its contact surfaces as that of the cone pulleys, the problems were resolved. An idler wheel mounted on a screw mechanism to shift the belt into a changed relationship on the cone pulleys provides an infinitely variable drive. By incorporation of the drive mechanism in a split housing, the belt can be put under tension without contact directly on the belt.

It is therefore an object of the invention to provide a cone pulley drive mechanism having a drive belt designed with the same pitch to its contact side walls as that of the pulleys. Another object is to provide a belt which will not "ride off" the pulleys or the idler wheel. A further object is to incorporate the drive mechanism in a split housing and to provide tensioning means for the drive belt. Yet another object is to provide an infinitely variable cone pulley drive of relatively inexpensive but highly efficient construction.

These and additional objects of the invention and features of construction will become more apparent from the description given below in which the terms are used for purposes of description and not of limitation.

Referring now to the drawing annexed hereto and forming an integral part of this specification, Fig. 1 is a side elevational view, partially in section, showing a preferred embodiment of the drive mechanism of this invention.

Fig. 2 is a bottom plan view of the mechanism of Fig. 1.

Fig. 3 is a fragmentary horizontal sectional view substantially on the line 3—3 of Fig. 1.

Fig. 4 is a reduced perspective view of the drive belt of this invention.

As shown in the several views of the drawing, and particularly in Figs. 1 and 2, the drive mechanism 10 comprises a split housing 12 having shells 14 and 16 hinged at 18 by a pin 20, a pair of rotatable cone drive pulleys 20 and 24, an endless belt 26, a belt shifting mechanism 28, and a belt tensioning mechanism 30.

The housing 12 has its shell portions 14 and 16 hingedly mounted at 18, so that the shells are pivotable about pin 20. The belt tensioning mechanism 30 operates to pivot the shells and thus, as will be shown below, to apply tension to the belt 26 as it engages the cone pulleys 22 and 24. The mechanism 30 comprises a hand wheel 32, a shaft 34 threaded at 36 for a portion of its length, a boss 38 having a pin 40 which it rotatably mounted on the shell portion 14, and a boss nut 42 having a pin 44 rotatably mounted on the shell portion 16. Boss nut 42 has a threaded bore to threadedly engage the portion 36 of shaft 34. The shaft end is provided with fixed collars 48 and 50 on both sides of the boss 38. As hand wheel 32 is rotated the screw portion 36 moves the boss nut 42 toward or away from the boss 38, thus bringing the shell portions 14 and 16 toward each other or spreading them apart.

The cone pulleys 22 and 24 are each supported in shell 14 on shafts 52 and 54, respectively, which are suitably mounted in bearings 56 mounted on the shell. Either pulley may be a driving or a driven pulley, as the particular application requires. A prime requisite, however, is that both pulleys have the same pitch or taper, and that they be arranged in reverse fashion with their axes in parallel.

The belt shifting mechanism 28 comprises an idler wheel 60 rotatably mounted on tubular support 62, a bearing 64 for the wheel to provide free rotation thereof, a tubular support 66 arranged transversely of the shell 16, a screw 68 operated by a hand wheel 70 outwardly of the shell, and a belt guide mechanism 72 affixed to the support 62 and slidable on the tubular support 66, which is suitably mounted in shell bosses 73 at either side of the shell 16.

The belt guide mechanism 72 comprises a bracket arm 74 having a leg 76 arranged with a pair of freely rolling guide wheels 78 rotatably mounted on pins 80 affixed in the leg 76. The belt guide wheels 78 are spaced apart from each other a distance substantially equal to the width of belt 26 which rides between the wheels. The bracket arm 74 is affixed to support 62 so that as the latter moves longitudinally of the tubular support 66 the belt 26 is shifted at the same time. Inwardly of the tubular support 66 and threadedly engageable by the screw 68 is a nut 82. Longitudinally of the support 66 is a slot 84 to provide a passage for the pin 86 that connects the nut 82 and the support 62. Thus, as the screw 68 advances or retracts the nut 82, the belt guide mechanism 72 is advanced or retracted along the support 66.

The endless belt 26 is designed with its inner and outer walls 88, 90 in parallel and at a slant to the vertical, so that the belt resting on a horizontal plane assumes generally the outline of a truncated cone as shown in Fig. 4. As a truncated cone, or of frusto-conical configuration, the two side walls 88 and 90 are parallel to each other and the top and bottom edges thereof are also parallel to each other and to the base plane. The idler wheel 60 is provided with a peripheral groove 92 having the pitch or slant of the cone pulleys 22 and 24. The slant or pitch of the belt walls is also the same as that of the pulleys and the idler wheel.

Thus, in operation the belt 26 naturally accommodates the cone pulleys 22 and 24, and the idler wheel 60, so that the belt inner wall 88 rides fully upon the cone pulley 22 and the idler wheel 60 and the belt outer wall 90 rides fully upon the cone pulley 24. There is no "riding off" or slip or shifting from side to side as happens with belts that are not made as here disclosed.

The belt 26 stays where it is put by the belt guide mechanism 72.

To shift the belt into a new position longitudinally of the cone pulleys, and thus to vary the output speed of the drive, the hand wheel 70 is rotated so that nut 82 advances on screw 68, moving support 62 along the tube 66. The guide wheels 78 move the belt 26, without difficulty, to the new position by sliding it across the faces of the cone pulleys. In this operation, the belt will not ride off the idler wheel 60, due primarily to the fact that the pitch or slant of the belt walls 88 and 90 is the same as that of the idler wheel groove 92, and there is no distortion of the belt.

It is respectfully submitted that the principal difficulty in mechanisms and drives of the type here described in the past has been the failure to recognize that the belt walls must be aslant at the pitch of the cone pulleys and that the groove of the idler wheel must also have the same pitch or slant.

A preferred method of producing the belt 26 of this invention is to mold the same from suitable materials, such as rubber, plastic or similar compositions, either plain or reinforced.

To relax the belt for any reason, or to apply tension to the belt, the hand wheel 32 is rotated so that screw 36 will draw the boss nut 42 toward or away from the boss 38 and thus move the housing shell 16 toward or away from the shell 14.

Having described the invention in its simplest terms it is to be understood that the features of construction may be varied in greater or lesser degree without departing from the essence of the invention.

I claim:

1. In a variable speed cone pulley drive mechanism, the combination comprising a pair of cone shaped pulleys arranged parallel and adjacent to each other and in reversed fashion, an endless drive belt for said pulleys, a belt shifting idler wheel axially parallel to and outwards of said pulleys having a peripheral belt groove of the same pitch as that of said cone pulleys, said belt having parallel inner and outer walls arranged at the same pitch as that of said cone pulleys and adapted to go partially over and upon the periphery of one of said pulleys and partially under and in engagement with the periphery of the second of said pulleys and partially over and upon the periphery of said idler wheel groove, the conical surfaces of the outermost pulley and the belt groove of said idler wheel being similarly directed.

2. In a variable speed cone pulley drive mechanism, the combination comprising a pair of parallel cone shaped drive pulleys of the same pitch arranged in reversed fashion adjacent each other, an endless drive belt for said pulleys, a belt shifting idler wheel axially parallel to and outwards of said pulleys having a frusto-conical peripheral belt groove of the same pitch as that of said cone pulleys, said belt having parallel inner and outer walls arranged at the same pitch as that of said cone pulleys and disposed partially over and upon the periphery of one of said pulleys, partially under and in direct engagement with the periphery of the second of said pulleys and partially over and upon the periphery of said idler wheel in said groove, the conical surfaces of the outermost pulley and the belt groove of said idler wheel being similarly directed.

3. In a variable speed cone pulley drive mechanism, the combination comprising a split housing having two shell portions hinged together at a line of contact between said portions, a pair of parallel cone shaped drive pulleys of the same pitch arranged in reversed fashion and supported on drive shafts mounted in one of said shell portions, an endless drive belt for said pulleys, a belt shifting mechanism including an idler wheel axially parallel to said pulleys and having a peripheral belt groove of the same pitch as that of said cone pulleys and supported on a shaft mounted in the other of said shell portions, said belt having parallel inner and outer walls arranged at the same pitch as that of said cone pulleys and disposed partially over and upon the periphery of one of said pulleys, and partially under and in direct engagement with the periphery of the second of said pulleys, and partially over and upon the periphery of said idler wheel in said groove, and means mounted on said shell portions to adjustably spread said shell portions apart about said hinged line of contact so as to apply a tensioning force upon said belt.

4. In a variable speed cone pulley drive mechanism, the combination comprising a split housing having two shell portions hinged together at a line of contact between said portions, a pair of parallel cone shaped drive pulleys of the same pitch arranged in reversed fashion and supported on parallel drive shafts mounted in one of said shell portions, an endless drive belt for said pulleys, a belt shifting mechanism in the other of said shell portions comprising an idler wheel having a peripheral belt groove of the same pitch as that of said cone pulleys and supported on a shaft mounted on the side walls of said other shell portion and screw means associated with said idler wheel to move said wheel longitudinally of its shaft and transversely of the faces of said pulleys, said belt having parallel inner and outer walls arranged at the same pitch as that of said cone pulleys and disposed partially over and upon the periphery of one of said pulleys, and partially under and in direct engagement with the periphery of the second of said pulleys, and partially over and upon the periphery of said idler wheel in said groove, and means mounted on said shell portions to adjustably spread said shell portions apart and alternatively to close them together about said hinged line of contact so as to apply a variable tensioning force upon said belt.

References Cited in the file of this patent

UNITED STATES PATENTS

| | | |
|---|---|---|
| 96,718 | Meriam | Nov. 9, 1869 |
| 2,799,175 | Peck | July 16, 1957 |

FOREIGN PATENTS

| | | |
|---|---|---|
| 91,180 | Germany | Apr. 17, 1897 |
| 66,427 | Sweden | Nov. 27, 1928 |